United States Patent [19]
Markyvech

[11] Patent Number: 5,910,069
[45] Date of Patent: Jun. 8, 1999

[54] TRANSMISSION SYSTEM CONTROL SYSTEM/METHOD INCLUDING ADAPTIVE CONTROL FOR ENGINE DECELERATION DEVICE

[75] Inventor: Ronald K. Markyvech, Allen Park, Mich.

[73] Assignee: Eaton Corporation, Cleveland, Ohio

[21] Appl. No.: 08/996,246

[22] Filed: Dec. 22, 1997

[51] Int. Cl.⁶ .................................................... F01L 1/34
[52] U.S. Cl. ............................................................ 477/109
[58] Field of Search ..................................... 477/107, 109

[56] References Cited

U.S. PATENT DOCUMENTS

| | | | |
|---|---|---|---|
| 5,409,432 | 4/1995 | Steeby | 477/71 |
| 5,425,689 | 6/1995 | Genise | 477/120 |

*Primary Examiner*—Dirk Wright
*Attorney, Agent, or Firm*—Howard D. Gordon

[57] ABSTRACT

A control system/method for controlling engine brake (50) assisted upshifts in a vehicular, at least partially automated transmission system (10). A value representing expected engine brake turn-off reaction time ($T_{REACTION}$) is adjusted as a function of sensed engine deceleration (dES/dt) at the time just prior to completing the assisted upshift.

6 Claims, 3 Drawing Sheets

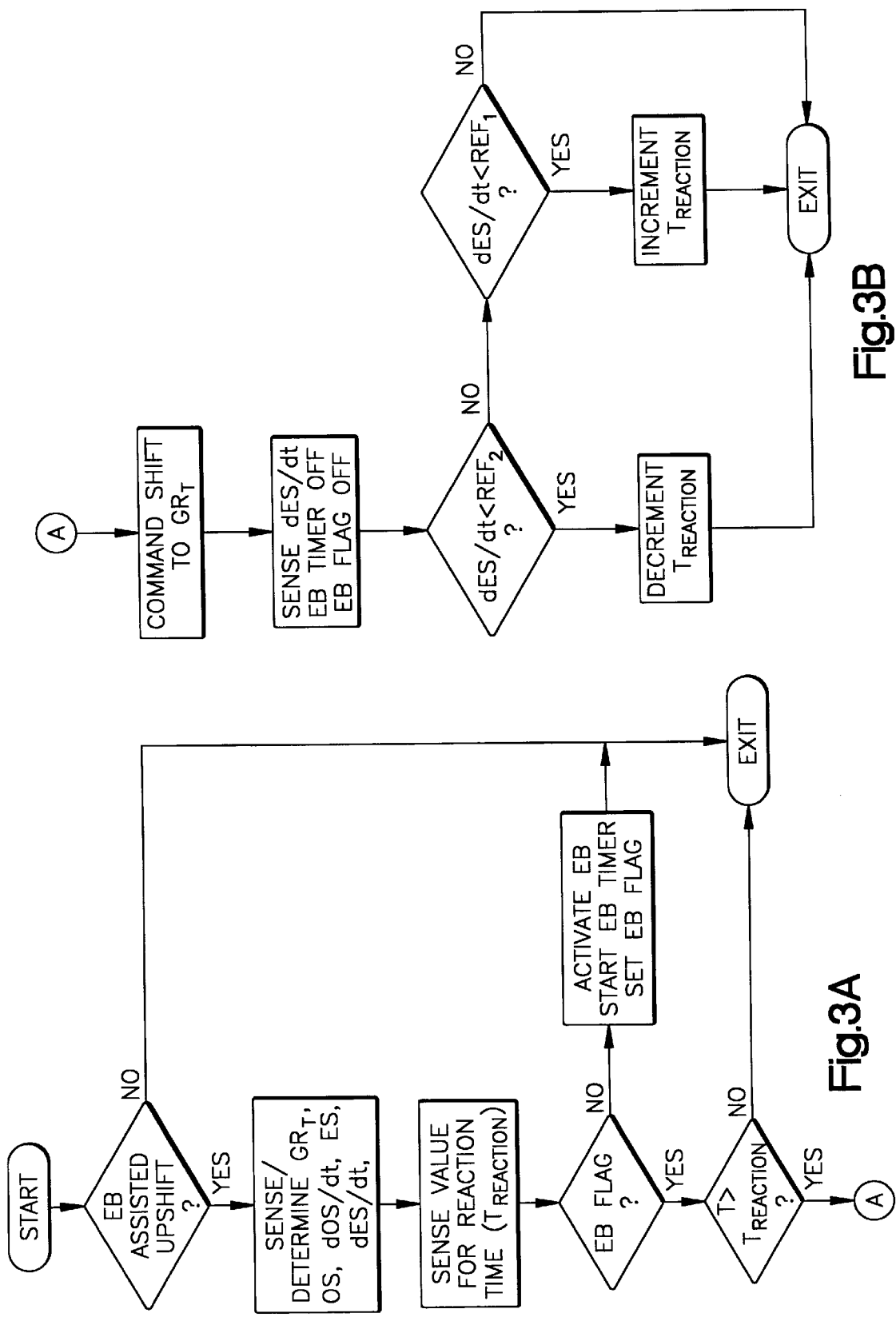

TRANSMISSION SYSTEM CONTROL SYSTEM/METHOD INCLUDING ADAPTIVE CONTROL FOR ENGINE DECELERATION DEVICE

BACKGROUND OF THE INVENTION

1. Related Applications

This application is related to copending U.S. patent application Ser. Nos. 08/461,715 filed Jun. 5, 1995, and 08/784,985 filed Jan. 17, 1997.

2. Field of the Invention

The present invention relates to a control system/method for controlling the shifting of vehicular fully or partially automated mechanical transmission systems of the type including an engine equipped with an engine retarding device or devices, such as a compression brake, and in particular, relates to a control system/method of the above-described type which is effective to adaptively determine the optimal time to deactivate the retarding device or devices to achieve rapid and smooth upshifting.

3. Description of the Prior Art

Vehicular fully and partially automated mechanical transmission systems are known in the prior art as may be seen by reference to U.S. Pat. Nos. 4,361,060; 4,595,986; 4,648,290; 4722,248; 5,050,427; 5,136,897; 5,335,566 and 5,582,558, the disclosures of which are incorporated herein by reference.

Such fully or partially automated mechanical transmission systems typically include a microprocessor-based controller for issuing command output signals to various controllers to implement or assist selected transmission shifts, including manipulation of the engine fueling and/or of engine or input shaft brakes to cause the transmission input shaft to rotate at a substantially synchronous speed for a given output shaft speed and target gear ratio.

Engine brakes, usually called "engine compression brakes" or "exhaust brakes" are well known in the prior art and such devices, such as the well known "Jake brake," are commonly provided on heavy duty vehicles. These devices are typically manually operated, may provide variable retardation by manual selection of one, two or three banks of cylinders operation, and are utilized to retard the vehicle and, in recent developments, to quickly retard engine/input shaft speed for more rapid synchronization during an upshift. Examples of vehicular automated mechanical transmission systems utilizing automatically actuated engine brakes may be seen by reference to U.S. Pat. Nos. 4,933,850; 5,042,327; 5,409,432 and 5,425,689, the disclosures of which are incorporated herein by reference.

Generally, as is well known in the prior art, engine compression brakes are effective to alter, usually hydraulically, the engine valve timing/porting so that a relatively large compressive force and resistance is provided to rotation of the engine and the vehicle drive wheels acting through to drive axles, drive shaft, transmission and master clutch.

Other devices and techniques to selectively retard engine rotation are also known. By way of example, by increasing the load on engine-driven accessories, such as air-conditioning, the deceleration of the engine may be increased. As used herein, the term "engine braking" or like terms is intended to include such devices and/or techniques, as well as techniques involving more common engine brakes.

The prior art automated mechanical transmission systems of the type having manually and/or automatically operated engine brakes were not totally satisfactory as engine brake assisted upshifts tended to be somewhat harsh and abrupt and/or were not as rapid as desired.

In accordance with aforementioned U.S. Pat. No. 5,409,432, some of the drawbacks of the prior art were overcome by the provision of control system/method for an engine brake-equipped automated mechanical transmission system which was effective to provide relatively smooth, high-quality, rapid upshifts. By allowing automatic actuation of the engine brake, during certain upshifts, the engine brake was operated by the system controller during an upshift to exert a minimum retarding torque at initiation of the shift and to then exert a smoothly increasing retarding torque, until a maximum retarding torque value is achieved, and to exert a smoothly decreasing retarding torque upon sensing that engine rotational speed (ES) and input shaft rotational speed (IS) were within a predetermined value (about 80 to 100 RPM) of synchronous speed, which is equal to the product of output shaft speed times the numerical value of the target gear ratio ($OS*GR_T$). The controller preferably initiated these events in advance in view of actuator response times, current values of engine speed and output shaft shaft, and/or the rates of change thereof.

A problem with the above-described and other systems utilizing automatically controlled engine braking to assist some or all upshifts was that a fixed offset or shut-off point was used to determine when to shut off the engine braking device. If the shut-off occurred too early in the shift, the upshift took too long because the transmission input shaft and associated gearing did not declerate as rapidly as desired. If the shut-off occurred too late in the shift, the input shaft and associated gearing may have decelerated too rapidly for a smooth engagement and/or may have decelerated to a speed making target ratio engagement difficult or impossible.

A problem associated with using engine retarding devices to assist upshifting is that these devices tend to have a relatively long response time (often 100–500 milliseconds) so that a command to shut off the devices must anticipate the actual optimal time to shut off the devices by several hundred milliseconds. Also, vehicle configuration (2 or 3 banks of cylinders available for compressor braking) and/or operating conditions will cause large fluctuations in vehicle retarding device performance.

SUMMARY OF THE INVENTION

In accordance with the present invention, the drawbacks of the prior art are minimized or overcome by the provision of an adaptive control system/method that monitors the performance of selected samples, or of all, engine retarding device assisting upshifts and adjusts the shut-off point offset accordingly based upon real time measurements. In a preferred embodiment, the foregoing is accomplished by sensing the engine or input shaft acceleration at the time of or just prior to completing an assisted upshift. If the acceleration is greater than a reference value (i.e., if deceleration is too low), then the retarding device was turned off too early and the offset time is decreased, if the acceleration is less than a reference value (i.e., if deceleration is too high), then the retarding device was turned off too late and the offset is increased. The decrements and increments to the offset value are preferably in relatively small values to prevent over-shifting of an optimal offset value.

Accordingly, it is an object of the present invention to provide a new and improved control for an automated mechanical transmission system equipped with an engine brake or other engine retarding device which will automatically control the engine brake during upshifts to provide smooth, high quality and rapid upshifts.

This and other objects and advantages of the present invention will become apparent from a reading of the following description of the preferred embodiment taken in connection with the attached drawings.

BRIEF DESCRIPTION OF THE DRAWINGS

FIGS. 3A and 3B schematic illustrations of the control system/method of the present invention in flow chart format.

DESCRIPTION OF THE PREFERRED EMBODIMENT

Figure 1:
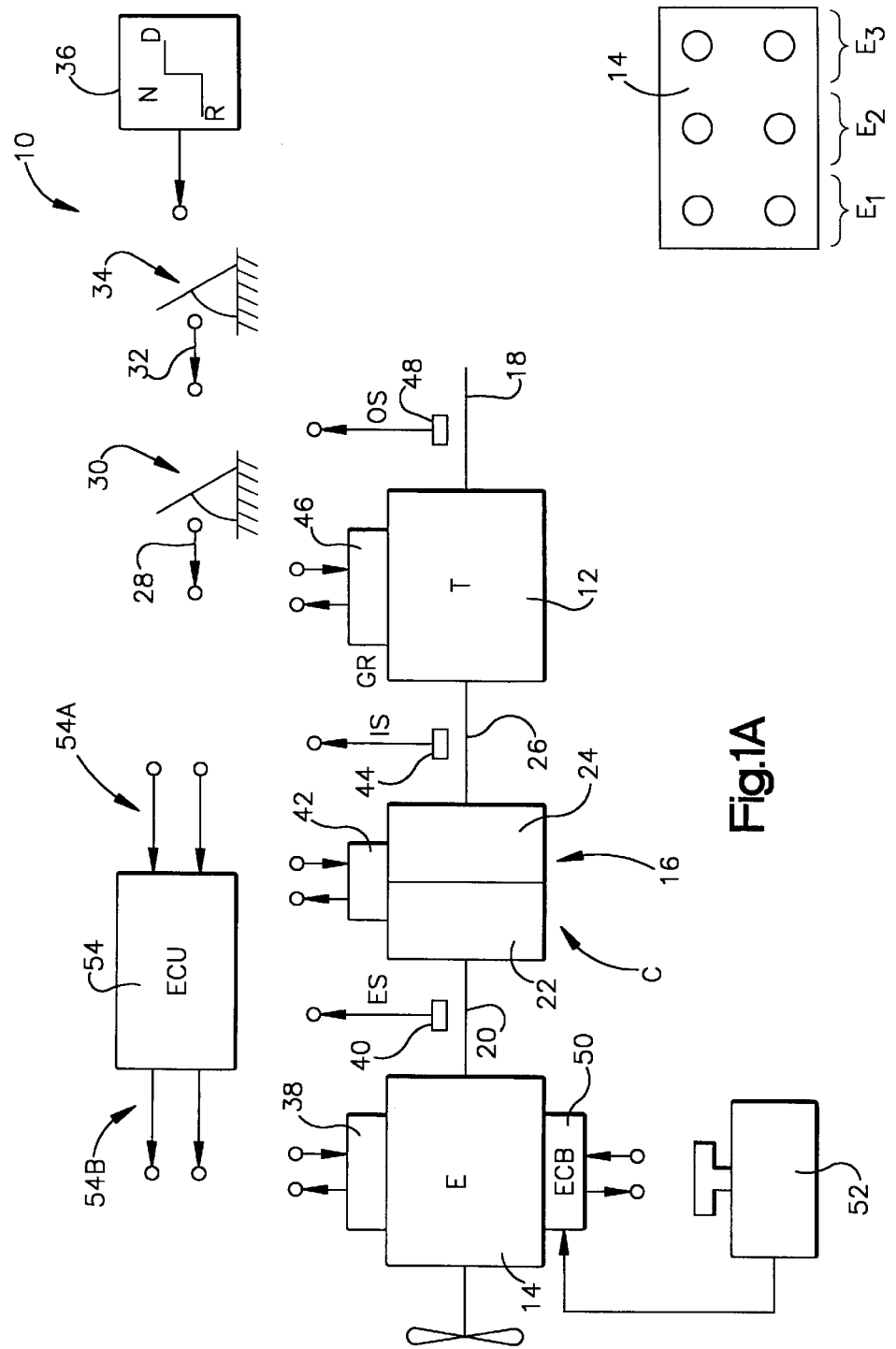
FIG. 1A is a schematic illustration of an automated mechanical transmission system of the type particularly well suited to be controlled by the method/apparatus of the present invention.
FIG. 1B is a schematic top view illustration of a typical six-cylinder diesel engine having three banks of two cylinders each.

FIG. 1 schematically illustrates a vehicular automated mechanical transmission system 10 including an automated multiple-speed, change-gear transmission 12 driven by a fuel control engine 14, such as a well-known diesel engine, through a non-positive coupling such as a master friction clutch 16. The output of the automated transmission 12 is output shaft 18 which is adapted for driving connection to an appropriate vehicle component such as the differential of a drive axle, a transfer case or the like, as is well known in the prior art.

The crankshaft 20 of engine 14 will drive the driving plates 22 of the master friction clutch 16 which are frictionally engageable to driven plates 24 for driving the input shaft 26 of transmission 12.

The above-mentioned power train components are acted upon, monitored by and/or controlled by several devices, each of which will be discussed briefly below. These devices include a throttle pedal position or throttle opening monitor assembly 28 which senses the operator set position of operator control throttle device 30, a brake applied monitor assembly 32 which senses operator operation of a brake pedal 34 and a shift control monitor assembly 36 by which the operator may select a reverse (R), neutral (N) or forward drive (D) mode of operation of the vehicle. The devices may also include a fuel controlled device 38 for controlling the amount of fuel to be supplied to engine 14, and engine speed sensor 40 which senses the rotational speed of the engine, a clutch operator 42 which engages and disengages master clutch 16 and which may also provide information as to the status of the clutch, and input shaft speed sensor 44 for sensing the rotational speed of transmission input shaft 26, a transmission operator 46 which is effective to shift the transmission 12 into a selected gear ratio and to provide a signal indicative of a gear neutral position and/or the currently engaged gear ratio of the transmission, and an output shaft speed sensor 48 for sensing the rotational speed of the output shaft 18. An engine brake 50 is provided for selectively retarding the rotational speed of engine 14 and a manually operated engine brake operator 52 is provided, usually in the vehicle cab, allowing the operator (as well as the system controller) to selectively apply the engine brake. Preferably, engine 14 is electronically controlled and is equipped to provide information on and to accept command signals from a data base conforming with a known protocol such as SAE J1939.

Drive components and controls therefor of the type described above are known in the prior art and may be appreciated in greater detail by reference to U.S. Pat. Nos. 4,959,986; 4,576,065 and 4,445,393, the disclosures of which are hereby incorporated by reference. The sensors may be of any known type of construction for generating analog and/or digital signal proportional to the parameter monitored thereby. Similarly, the operators may be of any known electric, hydraulic, pneumatic or combination type for executing operations in response to command output signals.

The above-mentioned devices supply information to and/or accept command outputs from a central processing unit or control 54. The central processing unit 54 may include analog and/or digital electronic calculation and logic circuitry as is well known in the prior art. An electrical power source (not shown) and/or a source of pressurized fluid (not shown) provides an electrical and/or fluid power to the various sensing and/or operating and/or processing units.

In addition to direct inputs, the central processing unit 54 may be provided with circuits for differentiating input signals from various of the sensors to provide a calculated signal indicative of the rates of change thereof.

As is known, and as disclosed in aforementioned U.S. Pat. No. 4,595,986, central processing unit 54 is adapted to receive various input signals 54A from the sensors and to process same according to predetermined logic rules to issue command output signals 54B to the appropriate system actuators.

In automated, mechanical transmission systems of the type illustrated in FIG. 1, synchronization of the jaw clutch members associated with engagement of a target gear ratio is normally accomplished by selectively increasing or decreasing engine speed, with a master clutch engaged, to cause the input shaft to rotate at a rotational speed generally equal to the product of the output shaft speed multiplied by the numerical ratio of the target gear ratio. For downshifts, where input shaft speed must generally be increased, increased fueling of the engine will provide the desired increase in engine speed while for upshifts, where input shaft speed must normally be decreased, reduced fueling of the engine will allow the engine speed to decay down to an acceptable value. However, where more rapid upshifting is required, the deceleration rate of the engine may be increased by the use of braking devices such as the engine compression brake 50 described above and/or an input shaft brake which is normally manually operated by a ride through detent switch associated with a master clutch control and thus is normally only seen with transmissions having a manual clutch pedal. Engine compression brakes have the added benefit of being manually operable to function as a retarder to supplement the vehicle brake system for operation such as descending a long grade which might seriously overheat the vehicle service brakes.

Engine brake 50, also known as an "engine compression brake" or an "exhaust brake" such as a well known "Jake Brake", are well known in the heavy duty truck industry. Briefly, such devices are usually manually actuated by an operator control such as switch 52, and are effective to apply a retarding torque to rotation of an engine, usually by hydraulically modifying the configuration of the engine exhaust valving. The exhaust brakes are typically used to provide two functions, first they are utilized to supplement the vehicle brake system to retard the vehicle under certain conditions such as traveling downhill and second they are also utilized during an upshift of a transmission, especially a skip upshift, to more rapidly achieve synchronous by retarding the rotational speed of the input shaft more rapidly than would occur under the normal deceleration of the input shaft and/or engine in the absence of exhaust braking. While the manual use of engine compression brakes with both manual and automated mechanical transmissions does provide more rapid upshifting, it has not been totally satisfactory as such engine brake assisted upshifts tend to be somewhat harsh and abrupt.

Figure 2:
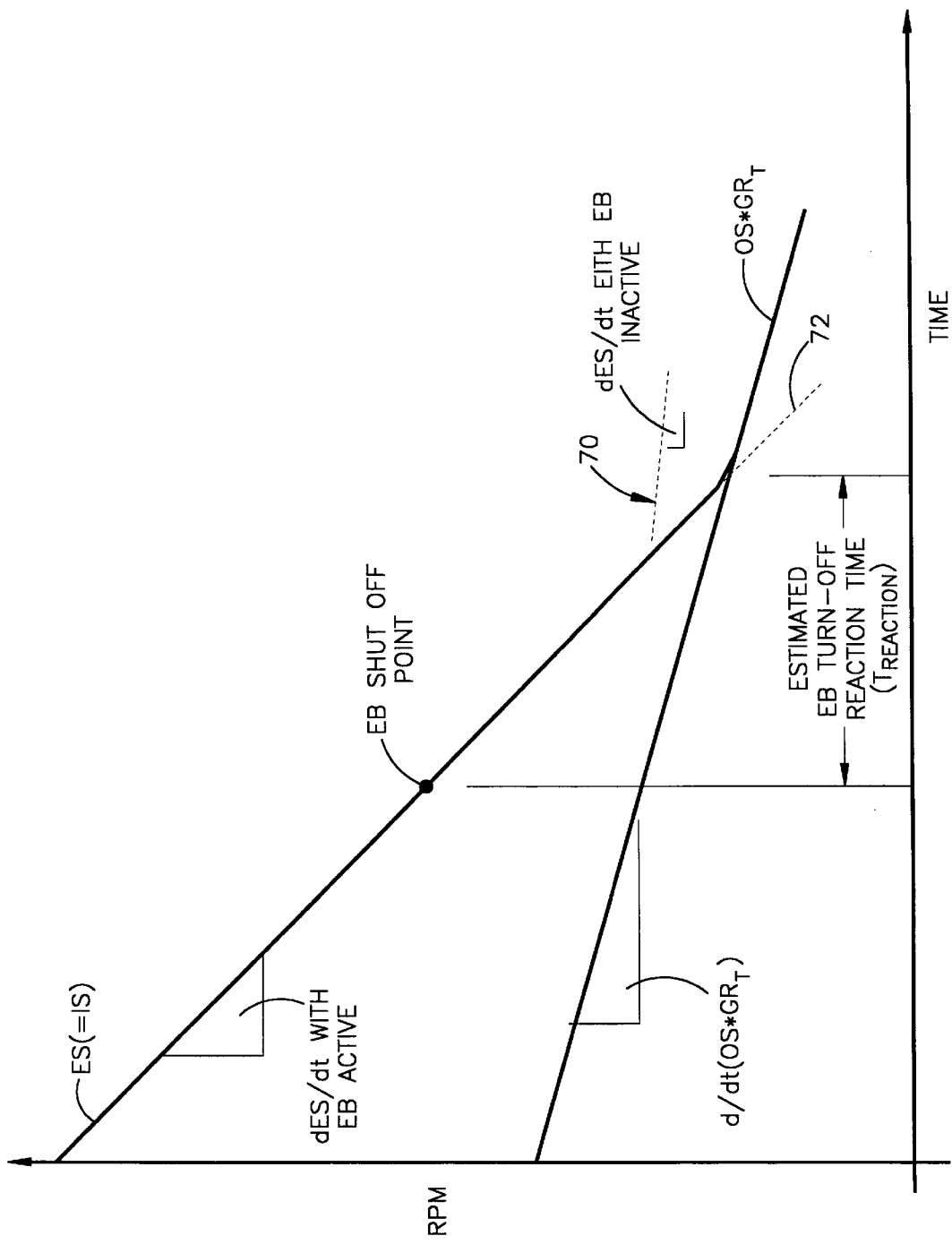
FIG. 2 is a schematic illustration of an engine brake-assisted upshift.

According to the present invention, as may be seen by reference to FIGS. 2 and 3, in addition to manual operation of engine brake 50, the engine brake is also operable in response to command output signals from system controller 54, which command output signals may be supplied via a data base conforming to the SAE J1939 protocol. In its preferred embodiment, the control method/system of the present invention will override manual control of the engine brake only during upshifts and will be effective to apply the engine brake in a manner designed to provide rapid, high-quality, smooth upshifting of the transmission 12. Referring to FIG. 2, the controller is effective to apply the engine brake in such a manner that the retarding torque of the engine brake will cease when engine speed is within the "synchronous window" ($OS \times GR_T \pm$ about 40 RPM). The transmission actuator 46 then will be commanded to cause engagement of the jaw clutch members of transmission 12 associated with the target gear ratio.

Engine brake devices tend to have relatively slow (long) reaction time and, thus, a signal to turn off the engine braking device must be generated about 200–300 milliseconds before a desired termination of retarding torque. This reaction time ($EB_{TURN\ OFF\ REACTION\ TIME}$) also tends to vary considerably with various vehicle operating conditions. Referring to FIG. 2, which schematically illustrates an engine brake-assisted upshift, an engine brake reaction time is assumed and, based upon this time value and the sensed or calculated values of engine speed (ES), rate of change of engine speed (dES/dt), output shaft speed (OS), rate of change of output shaft speed (dOS/dt) and the numerical value of the target gear ratio ($GR_T$), a shut-off point is selected when a command is issued to the engine brake to turn off. The shut-off point is selected so that at the end of the reaction time, the engine brake will be off and ES= ($OS*GR_T$)$\pm$about 40 RPM. If the engine brake is turned off too soon (i.e., if the assumed reaction time exceeds the actual reaction time, see line segment 70), the engine speed will revert to the normal decay rate (dES/dt with engine brake inactive)) and it will take an excessive amount of time for ES=($OS*GR_T$)$\pm$40. If the engine brake is turned off too late (i.e., if the actual reaction time exceeds the assumed reaction time, see line segment 72), then the engine speed will continue to rapidly decrease beyond the value of ES=($OS*GR_T$)$\pm$40 and harsh or unachievable shifts may result.

If the assumed reaction time is generally equal to the actual reaction time, at the expiration of the assumed reaction time, the sensed rate of change of engine speed will be greater than the unassisted decay rate but less than the rate with the engine brake active. Accordingly, comparing the sensed deceleration of the engine (dES/dt) to reference values will provide an indication of whether the actual engine brake reaction time is generally equal to, greater than or less than the assumed reaction time. If engine deceleration after the assumed reaction time is greater than or equal to a first reference value (dES/dt>$REF_1$), where the first reference value is generally equal to but somewhat less than the engine brake-assisted engine deceleration rate, then the actual reaction time is greater than the assumed reaction time and the assumed reaction time will be incremented by a predetermined value, usually relatively small to prevent overshooting. If engine deceleration after the assumed reaction time is equal to or less than a second reference value (dES/dt<$REF_2$), where the second reference value ($REF_2$) is a value generally equal to the unassisted decay rate of the engine (dES/dt with engine brake inactive), then the actual reaction time is less than the assumed reaction time and the value of the assumed reaction time will be decremented by a small amount. FIG. 3 schematically illustrates the control system/method of the present invention in flow chart format.

Preferably, the amount by which the assumed reaction time ($T_{REACTION}$) is incremented or decremented is relatively small, about 5–20 milliseconds. Alternatively, the reaction time could be corrected by a variable amount determined as a function of dES/dt at the end of the reaction time and/or other system variables. Further, the values of the reference values ($REF_1$ and/or $REF_2$) can be predetermined or varied as a function of sensed parameters, such as sensed unaided engine decay rate or the like.

Although the present invention has been described with a certain degree of particularity, it is understood that the description of the preferred embodiment is by way of example only and that numerous changes to form and detail are possible without departing from the spirit and scope of the invention as hereinafter claimed.

I claim:

1. A control method for controlling upshifting in a vehicular, at least partially automated mechanical transmission system (10) comprising a throttle controlled engine (14) a mechanical change gear transmission (12) having a plurality of gear ratio combinations selectively engageable between a transmission input shaft (26) and a transmission output shaft (18), each of said gear ratio combinations defining a numerical ratio of input shaft rotational speed to output shaft rotational speed, an information processing unit (54) having means for receiving a plurality of input signals including an input signal (ES) indicative of the rotational speed of said engine and an input speed (OS) indicative of the rotational speed of said output shaft and means for processing said input signals in accordance with predetermined logic rules for generating command output signals (54B) whereby said transmission system is operated in accordance with said logic rules, an engine brake (50) selectively actuatable to provide a retarding torque to rotation of said engine, and actuators responsive to said command output signals including an engine brake actuator for selectively applying said engine brake, said control method characterized by the steps of, upon initiating an engine brake-assisted upshift into a target gear ratio ($GR_T$) by activating the engine brake after sensing a transmission-neutral condition:

(a) sensing values indicative of one or more of engine speed, rate of change of engine speed, output shaft speed, and rate of change of output shaft speed;

(b) determining an engine brake reaction time ($T_{REACTION}$) value indicative of a period of time required for the engine brake to cease providing a retarding torque to resist rotation of the engine from initiation of a command signal to said engine brake actuator to deactivate said engine brake;

(c) issuing a command signal to said engine brake actuator to deactivate said engine brake at a time determined as a function of (i) the numerical ratio of the target gear ratio ($GR_T$), (ii) one or more of output shaft speed and rate of change thereof, (iii) one or more of engine speed and rate of change thereof and (iv) engine brake reaction time.

(d) after the passage of said reaction time from issuing said command signal to said engine brake actuator, sensing the then current value of the rate of change of engine speed (dES/dt) and modifying said engine brake reaction time as a function of said current value of said rate of change of engine speed.

2. The method of claim 1 wherein said system further comprises a transmission actuator responsive to said command output signals for selectively engaging and disengaging selected gear ratios and step (d) further comprises commanding engagement of said target gear ratio.

3. The method of claim 1 wherein said value of said engine brake reaction time is decreased if the then current value of the rate of change of engine speed is less than a first reference value ($REF_1$) and is increased if the then current value of the rate of change of engine speed is greater than a second reference value ($REF_2$), said first reference value being lower than said second reference value ($REF_1 < REF_2$).

4. The method of claim 2 wherein said value of said engine brake reaction time is decreased if the then current value of the rate of change of engine speed is less than a first reference value ($REF_1$) and is increased if the then current value of the rate of change of engine speed is greater than a second reference value ($REF_2$), said first reference value being lower than said second reference value ($REF_1 < REF_2$).

5. The method of claim 3 wherein said engine has an expected rate of change of engine speed with the engine brake active and a different expected rate of change of engine speed with the engine brake not active, and said first reference value is similar to the expected rate fo change of engine speed with the engine brake activated, and the second reference value is similar to the expected rate of change of engine speed with the engine brake deactivated.

6. The method of claim 4 wherein said engine has an expected rate of change of engine speed with the engine brake active and a different expected rate of change of engine speed with the engine brake not active, and said first reference value is similar to the expected rate fo change of engine speed with the engine brake activated, and the second reference value is similar to the expected rate of change of engine speed with the engine brake deactivated.

* * * * *